United States Patent
List et al.

(10) Patent No.: US 7,144,083 B2
(45) Date of Patent: Dec. 5, 2006

(54) HEADREST FOR A VEHICLE SEAT

(75) Inventors: Ronald List, Hahnbach (DE); Marian Edward Sikora, Düsseldorf (DE); Peter Schmuda Von Trzebiatowski, Schöppenstedt (DE)

(73) Assignees: Grammer AG, Amberg (DE); Volkswagen AG, Wolfsburg (DE)

( * ) Notice: Subject to any disclaimer, the term of this patent is extended or adjusted under 35 U.S.C. 154(b) by 0 days.

(21) Appl. No.: 10/552,242

(22) PCT Filed: Apr. 1, 2004

(86) PCT No.: PCT/DE2004/000703

§ 371 (c)(1),
(2), (4) Date: Jan. 12, 2006

(87) PCT Pub. No.: WO2004/091965

PCT Pub. Date: Oct. 28, 2004

(65) Prior Publication Data

US 2006/0131947 A1     Jun. 22, 2006

(30) Foreign Application Priority Data

Apr. 11, 2003   (DE) .............................. 103 17 036

(51) Int. Cl.
*B60R 22/28*    (2006.01)
(52) U.S. Cl. ...................................... 297/391

(58) Field of Classification Search ................ 297/406, 297/391
See application file for complete search history.

(56) References Cited

U.S. PATENT DOCUMENTS

| | | | |
|---|---|---|---|
| 4,720,146 A | 1/1988 | Mawbey et al. | |
| 4,883,243 A | 11/1989 | Herndon | |
| 6,250,716 B1 | 6/2001 | Clough | |
| 6,513,871 B1 * | 2/2003 | Bartels | 297/216.12 |

FOREIGN PATENT DOCUMENTS

| | | |
|---|---|---|
| DE | 195 28 716 | 2/1997 |
| DE | 100 05 196 | 8/2001 |
| DE | 202 04 949 | 7/2003 |
| GB | 1 592 141 | 7/1981 |

* cited by examiner

*Primary Examiner*—Milton Nelson, Jr.
(74) *Attorney, Agent, or Firm*—Andrew Wilford

(57) ABSTRACT

A motor-vehicle headrest has an upright mounting rod adapted to be anchored in a vehicle seat back and an upright rear wall at an upper end of the rod and forming part of a rear forwardly open housing shell. An upright front wall forming part of a front rearwardly open housing shell is spaced forward of and directly forms with the rear wall a cavity containing the upper end of the rod. The front wall is formed by a pair of side portions unitary with each other and each forming a wing. Membrane hinges between and formed unitarily with the side portions pivot the side portions about at least one upright axis. Upholstery surrounds the portions of the front wall.

17 Claims, 8 Drawing Sheets

Fig.9

HEADREST FOR A VEHICLE SEAT

CROSS REFERENCE TO RELATED APPLICATIONS

This application is the US national phase of PCT application PCT/DE2004/000703, filed 1 Apr. 2004, published 28 Oct. 2004 as WO 2004/091965, and claiming the priority of German patent application 10317036.7 itself filed 11 Apr. 2003.

FIELD OF THE INVENTION

The invention relates to a headrest for a vehicle seat having an upholstery support mounted by at least one mounting rod above the top of a seat back and having housing walls defining a cavity.

BACKGROUND OF THE INVENTION

Such a headrest is known from public use and also from German 202 04 949. The headrest according to German 202 04 949 has an upholstered body with front and rear housing walls. Front-wall end regions to both sides of its central region carry respective wings pivotal about vertical axes and latchable in various offset positions. Each pivotal wing forms a support for its own upholstery. The two wings form a comfortable cradle for the head of the passenger and, in an accident, do not automatically return to their starting positions so they provide a safe support for the passenger's head.

The headrest according to German 202 04 949 has shown itself good in practice but this known headrest can be improved in several ways.

OBJECT OF THE INVENTION

It is an object of the instant to so improve the well known headrest of German 202 04 949 that it has a simpler construction but still pivots better.

SUMMARY OF THE INVENTION

This object is attained in that the headrest has a front housing wall defining a head-engaging face that has two pivotally arrestable wings flanking a central portion, forming a support structure for upholstery, and pivotable about at least one upright pivot axis, the wings each being formed by portions of the front housing wall that directly define the cavity.

Whereas the headrest of German 202 04 949 has pivotal wings that are formed as separate parts mounted externally on the front housing wall of the support, this invention forms them directly as sections of the front housing wall so that the housing wall parts also form the pivotal wings that directly define the holder cavity. In contrast to the headrest of German 202 04 949, the upholstery support according to the invention is a particularly simple part made with fewer tools and less material than the hitherto used part, without in any way disadvantageously affecting the functioning of the pivotal-wing structure.

According to a further feature of the invention the support is mounted via at least one angle adjuster on the mounting rod. With this feature a headrest is created that can be called a "six-way headrest," if one considers the two opposite adjustment movements of the along the mounting rod (height adjustment), the pivotal positions of the wings (pivot adjustment), and the angle adjuster (angular adjustment). These six degrees of adjustment allow the user to get any desired individual position.

Angular adjustment is known per se from a pivot-wing headrest as described in German 195 28 716.

According to a preferred embodiment of the invention, the support is formed by two secured-together housing shells, namely a front housing shell and a rear housing shell, and the front shell forms the front housing wall. This fitting together of the rear housing shell and the front housing shell having the two wings forms the support in a very simple manner.

In a preferred embodiment of the invention, the front housing wall has a central stationary portion, and edges of the central portion each carrying a wing. Such a simple shape of the pivots is attained according to the invention in that the pivots are formed as plastic membrane hinges for the wings.

A particularly attractive and jam-safe head headrest according to the invention is attained when each wing is formed on its outer edge with a rearwardly extending rim that overlaps a respective outer edge region of the support and outwardly closes in every pivotal position of the wing the cavity of the support.

Here the rim, which serves both to hold the upholstery forming the headrest surface, can be drawn from the pivot axes over almost the entire headrest.

According to other features of the invention inside the cavity between the central region of the front housing wall and the rear housing wall of the support there is a block-like brace fixed on the front housing wall and/or on the rear housing wall and this brace serves for mounting the support on the mounting rod. With this embodiment the block-like brace forms the core of the support. This central core also serves as mount for the mounting rod and also for the angle adjuster of the headrest, can be the same even if other characteristics, as for instance the width, of the headrest change.

In a further embodiment of the invention the brace is fixed either on the rear housing wall or on the front housing wall, in particular is unitary therewith.

In addition according to the invention the brace is subdivided along a plane generally parallel to the rear wall and to the front wall, and the rear part of the brace is fixed on the rear housing wall and the front part is fixed on the front housing wall, preferably unitary therewith. Such a preferred embodiment makes one-step assembly possible including the installation of the angle adjuster and mounting rod. This is facilitated with the rod support is a U-shaped rod bow with a friction socket held nonrotatably in the support region.

BRIEF DESCRIPTION OF THE DRAWING

A preferred embodiment of the invention is more closely described with reference to the drawing, therein.

SPECIFIC DESCRIPTION

A headrest 10 has a front part 11 and a rear part 12. The headrest 10 also has two mounting rods 13 so that the vertical height of the headrest 10 can be adjusted at the top of an unillustrated seat back of a motor-vehicle seat.

The front part 11 forming a head-support surface A is externally covered with upholstery 14 including a textile cover 15.

The rear part 12 is formed in this embodiment by a rear housing shell 16 forming a smooth outer surface 17 and itself made of injection-molded plastic. In some cases it might be necessary to provide upholstery or a cover in addition to or instead of the smooth rear face 17.

Figure 1:
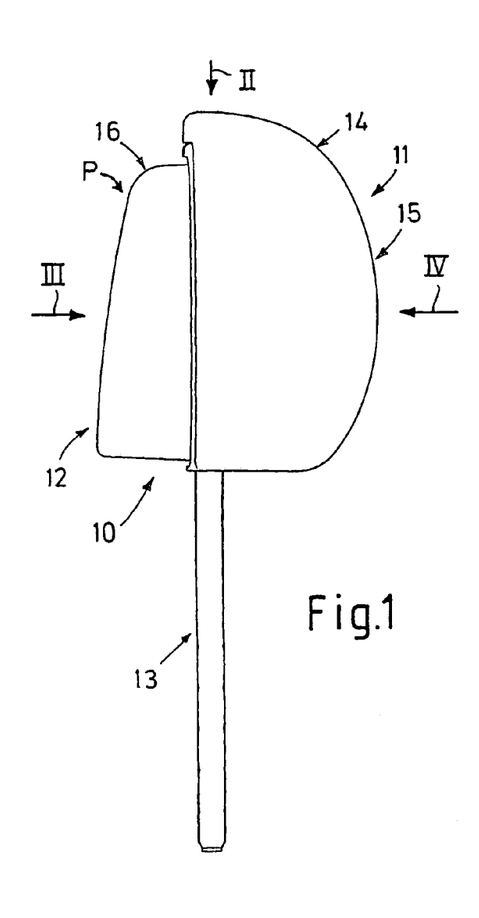
FIG. 1 is a side view of a headrest.
Figure 2:
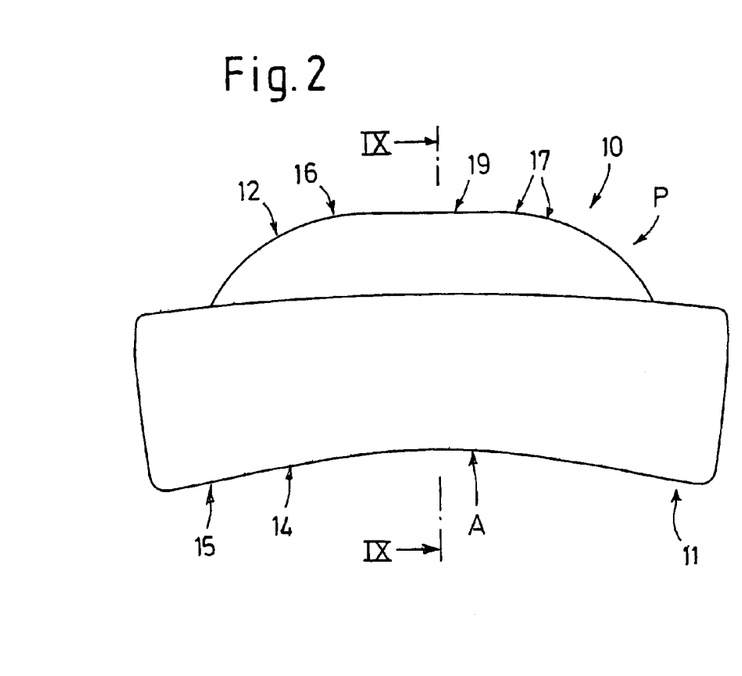
FIG. 2 is a top view of the headrest in the direction of arrow II of FIG. 1.
Figure 3:
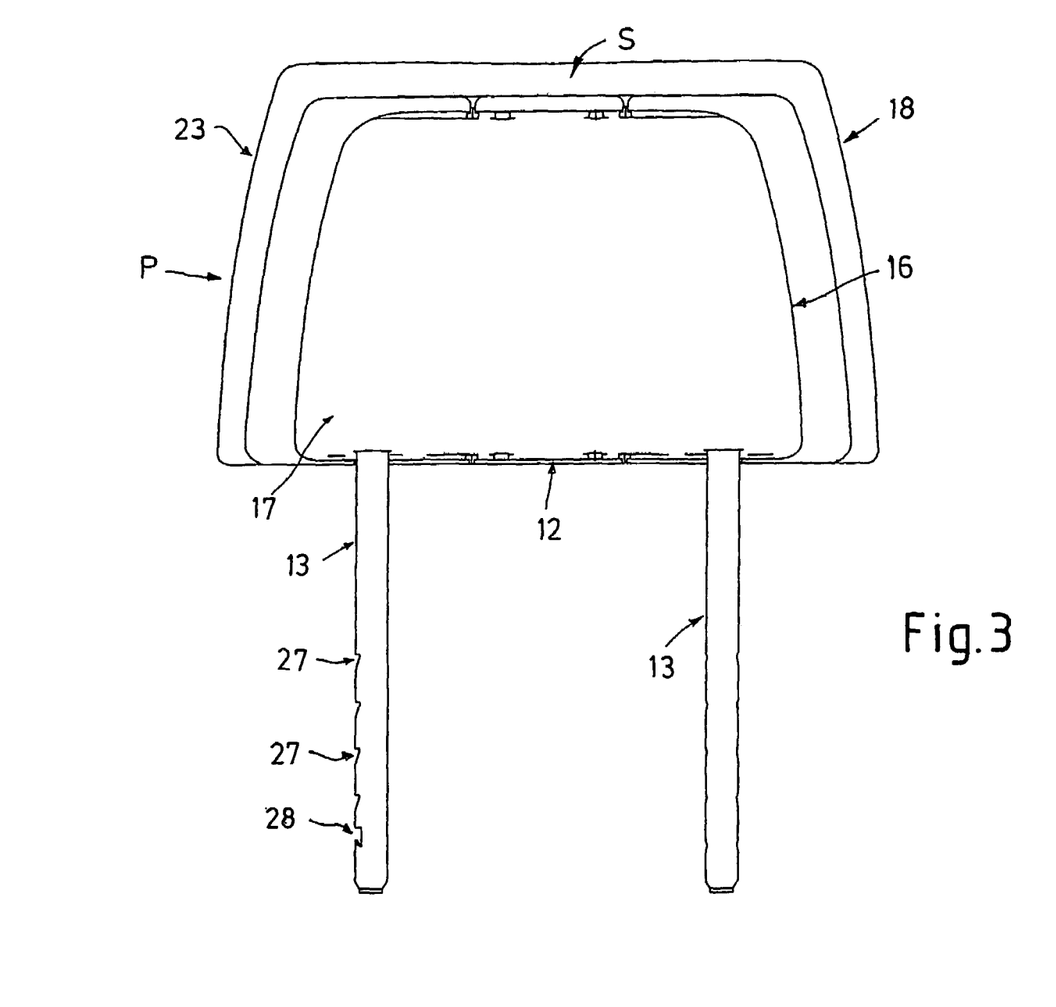
FIG. 3 is a back view of the headrest in the direction of arrow III of FIG. 1.
Figure 4:
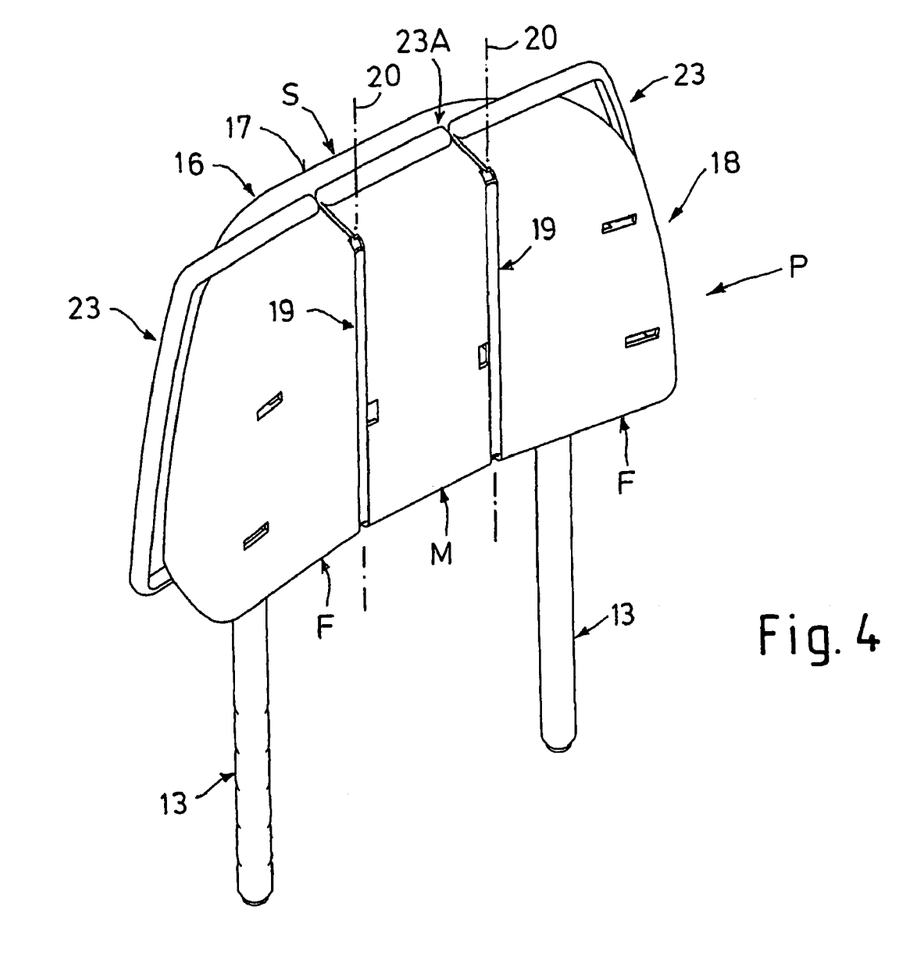
FIG. 4 is a perspective view of the headrest generally in the direction of arrow IV of FIG. 1.
Figure 8:
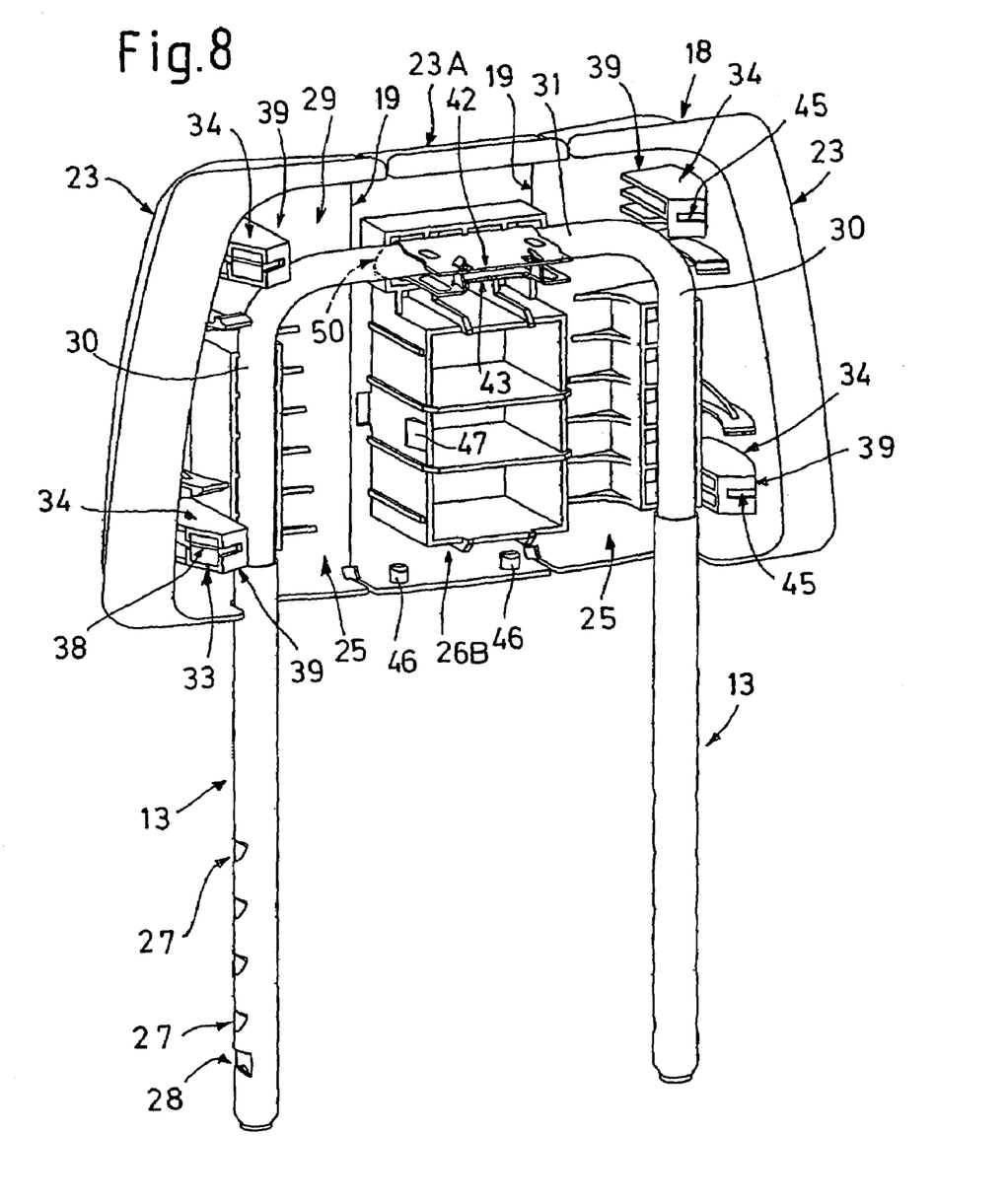
FIG. 8 is a perspective back view of a portion of the headrest (direction II of FIG. 1) into the front housing shell (with the rear shell removed)
Figure 9:
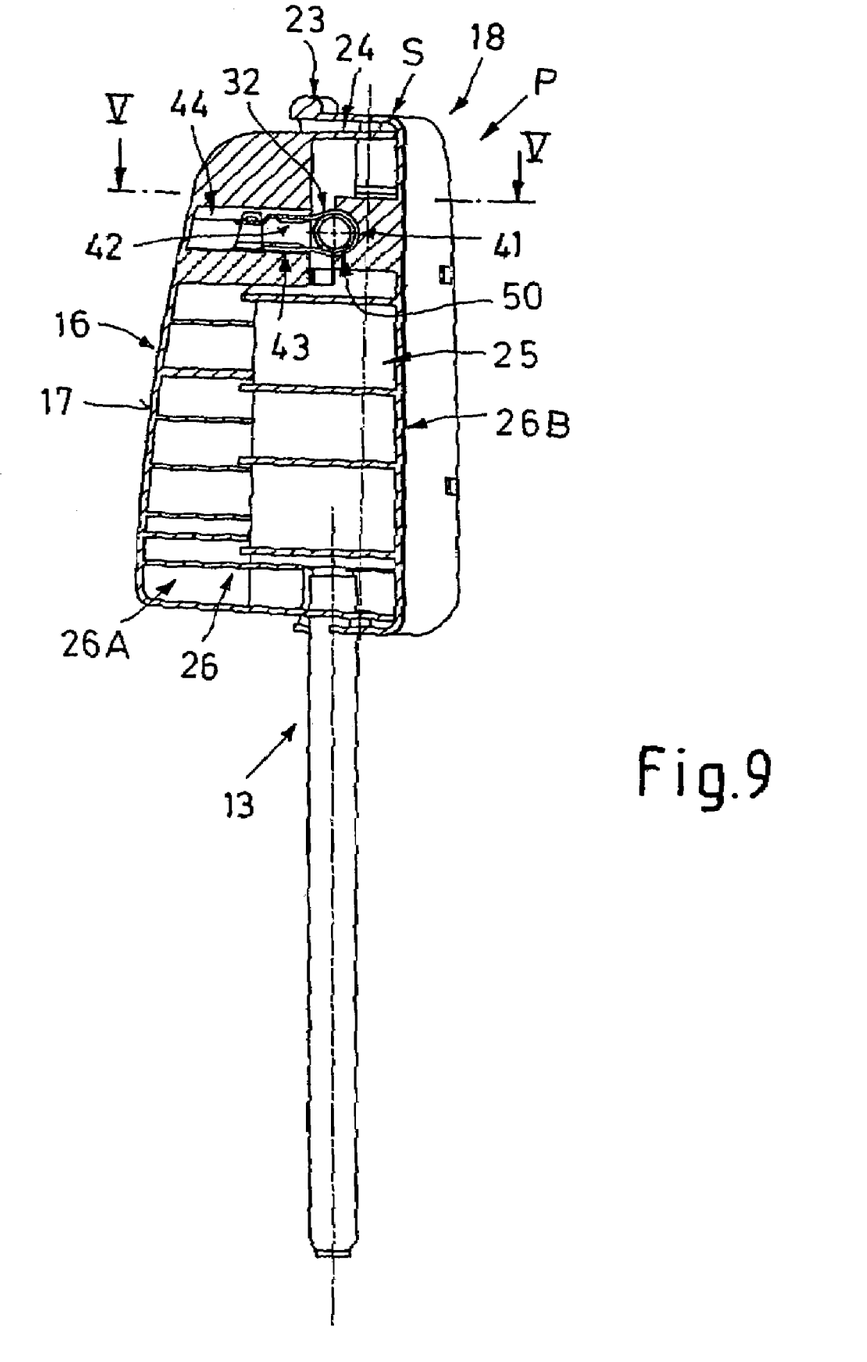
FIG. 9 is a longitudinal section through the headrest generally along section line IX—IX of FIG. 2.

Inside the front part 11 there is a front housing shell 18 (see e.g. FIGS. 4 and 8).

The rear housing shell 16 forms the rear housing wall of the upholstery support shown generally at P, while the front housing shell 18 similarly forms the front housing wall.

The front housing wall 18 has a central portion N and two outer portions F flanking the central portion M.

While the central portion N is a stationary part of the support P, the two outer portions are each formed as a pivotal wing F. Each wing F is pivotally carried by a membrane hinge 19 on a respective outer edge of the central portion M.

Figure 5:
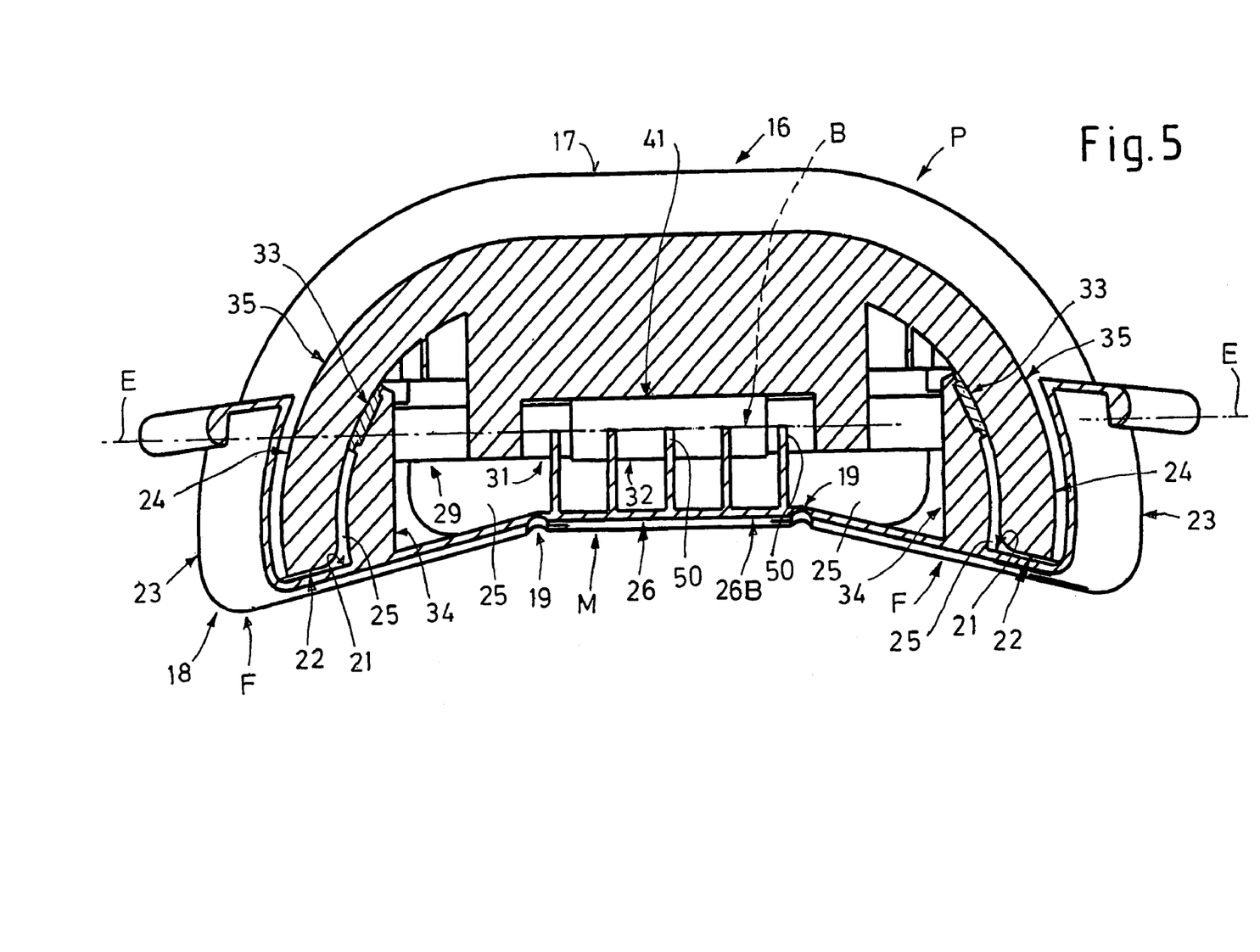
FIG. 5 is a section through the headrest with pivoted-back wings taken generally along line V—V of FIG. 9.
Figure 6:
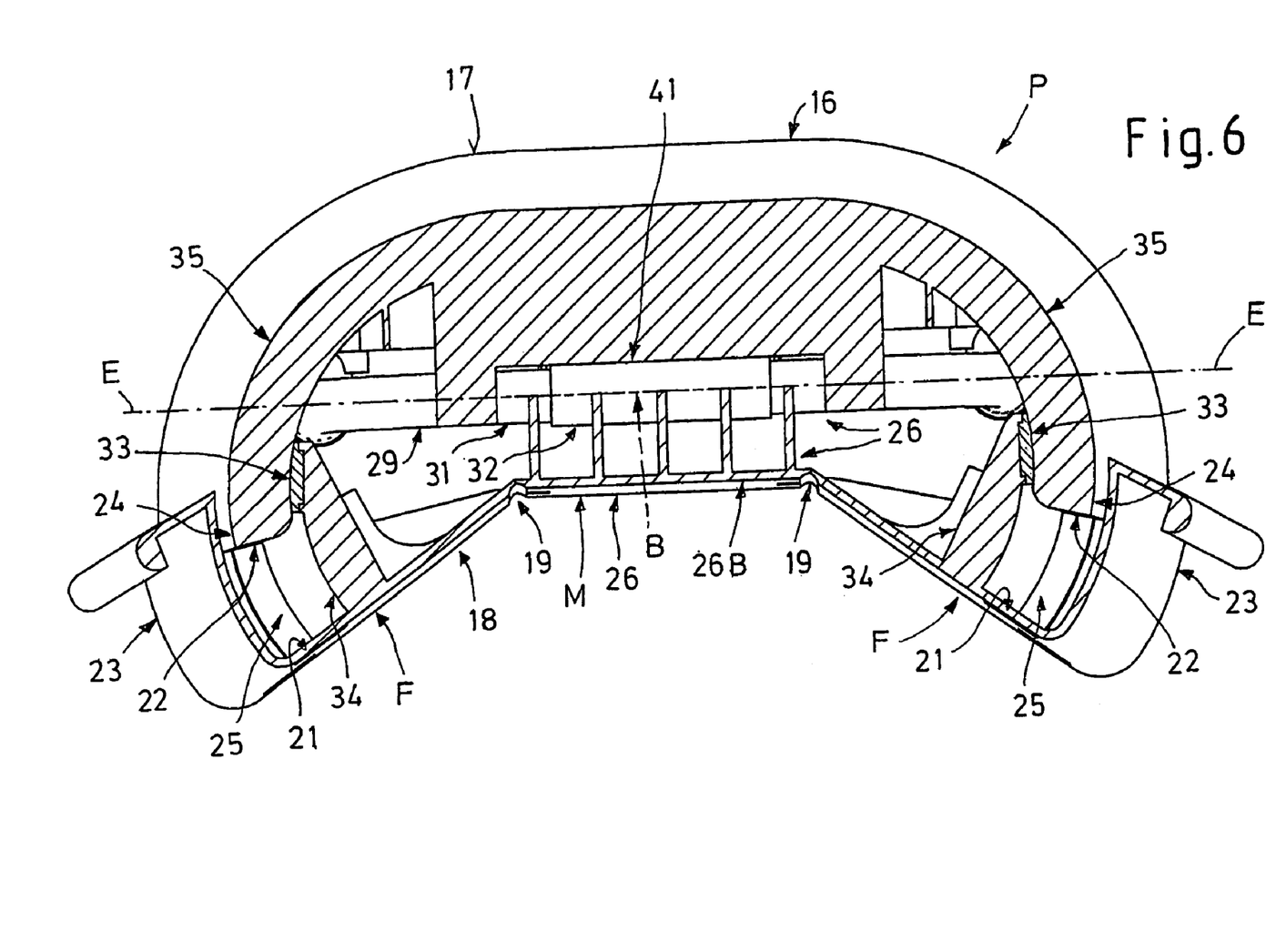
FIG. 6 is a view like FIG. 5 but with the wings pivoted forward.
Figure 7:
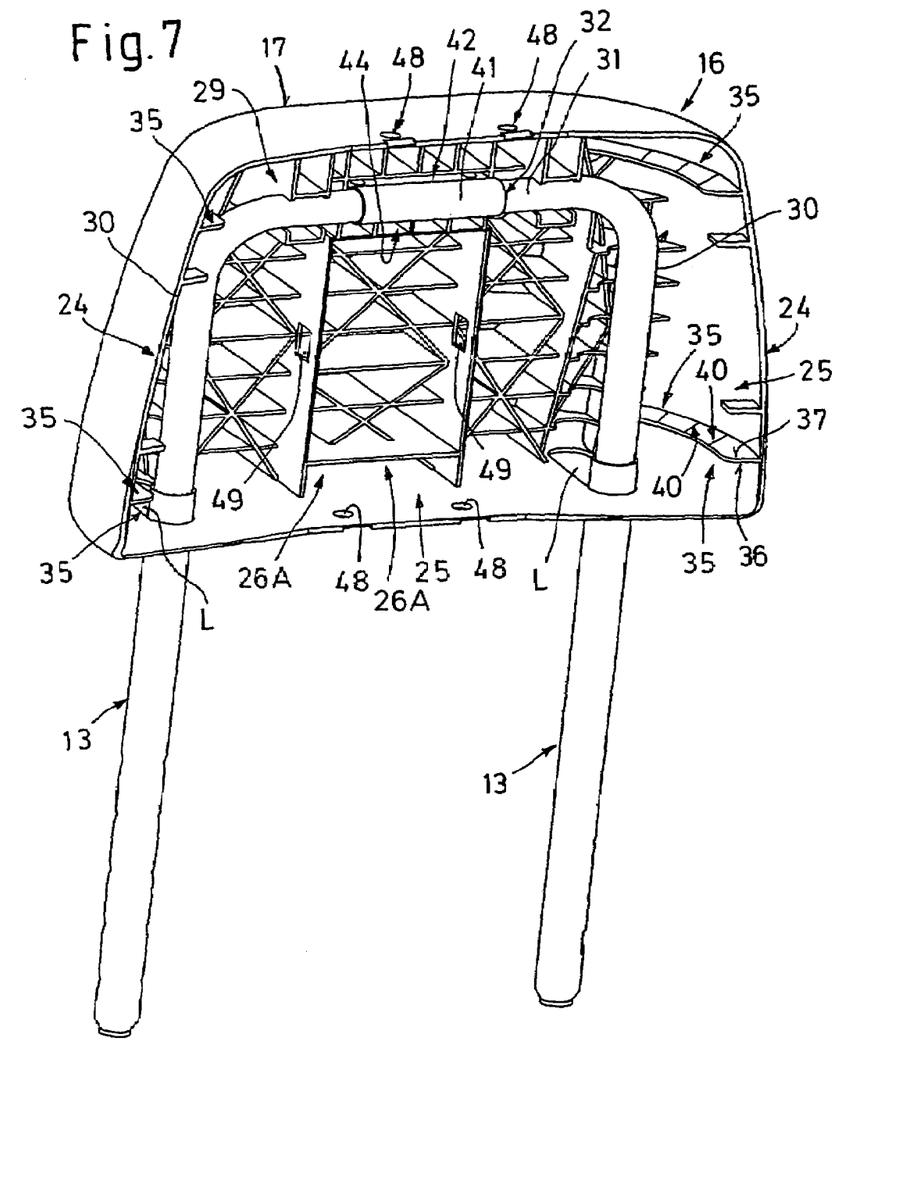
FIG. 7 is a perspective view from the front (direction IV of FIG. 1) into the rear housing shell (with the front shell removed)

The two membrane hinges 19 here form vertical pivot axes 20 about which the two wings can pivot from their rear positions of FIG. 4 (see also FIG. 5) into their partially or fully advanced front positions of FIG. 6.

Between each of the wings F and the rear housing shell 16 there are two pivot stops 21 and 22 that in the front position of the wings F of FIG. 6 are spaced apart and in the fully back position of the wings of FIG. 5 engage each other.

Each wing F has at its outer edge a rim 23 that rearwardly overlaps an outer edge region 24 of the rear housing shell 16 of the support P and thus outwardly closes a cavity 25 of the support P in every angular position of the respective wing F.

The rims 25 extend generally around the edge of the respective wings F and in the central portion M a stationary rim part 23A completes them.

Inside the cavity 25 between the central portion M of the front housing wall or of the front housing shell 18 and the rear housing wall or the rear housing shell 16 there is a stationary, in particular block-like, brace 26 fixed to the support P.

The brace 26 is subdivided along a plane E generally parallel to the rear housing wall 16 and the front housing wall 18 into brace parts 26A and 26B.

The brace parts 26A and 26B are respectively unitarily formed with the rear housing wall 16 and the front housing wall 18. The rear housing shell or the rear housing wall 16 and the front housing shell or the front housing wall 18 are each formed as a single injection-molded plastic piece.

The two mounting rods 13, which have height-adjustment detent notches 27 and a retaining seat 28 preventing inadvertent removal, form parts of a U-shaped support bow 29 with upper rod ends 30 joined by a bight 31. The latter is mounted in a spring-steel socket 32 fixed against rotation in the brace 26.

Each wing F has an arm 34 extending into the cavity 25 and carrying a movable square, entropy-elastic friction element 33.

The entropy-elastic body is formed of a PU foam marketed as "Cellasto" by Elastogran GmbH of 49440 Lemforde, Germany.

The movable friction element 33 cooperates with a fixed friction element that is formed as a friction rail 35 formed as a rib of square section extending into the cavity 25 and having a lower friction surface 36 and an upper friction surface 37.

The movable friction element 33 is a compact body that has a slot 38 fitted over the friction rail 35, so that the rail 35 bears on the slot 38 with its lower friction surface 37 and with its upper friction surface 36. The friction element 33 is fitted in a seat 39 open toward the rail 35 and formed on the outer face of the respective arm 35. Each rail 35 is formed inside the rear housing shell 16. Each rail 35 can be provided on its friction surfaces 36 and 37 with transversely projecting bumps 40 that permit a step-wise arresting of the respective pivotal wing F.

Each friction element 33 and each friction rail 35 extend along an arcuate path centered on the axis 20 of the respective wing F.

The rear housing part 16 has four friction rails 35 each cooperating with friction bodies 33 on the arms 34.

The support P is mounted on the U-shaped support bow 29 as follows:

The support bow 29 is preassembled with the socket 32, that fits with its slotted tube 41 around the bight 31. Its two legs 42 and 43 are latched elastically together.

The two rods 13 of the support bow 29 are to start with passed down through two slots L in the lower part of the rear housing shell 16. Then the two latched-together socket legs 42 and 43 are fitted in a horizontal seat 44 formed in the brace part 26A. In this manner the socket 39 is prevented from rotating in the rear housing part 16. The housing shell 16 with the support P can pivot limitedly with pivoting of the socket 32 on the bight 31 only after some friction is overcome.

For further assembly the front housing part 18 is fitted with its open side on the parts 16 and 29, with the outer edges of the rails 35 fitting in the rearwardly opening slots 45 of the mounting frame 39 and thus in the slots 38 of the friction bodies 33.

Then the front housing shell 18 is pushed against the rear housing shell 16 so that a row of latches of the front housing shell 18 fit in complementary seats in the rear housing shell 16 to permanently join them together.

Such latches can for example be projections 46 and 47 of the front housing shell 16 and complementary seats 48 and 49 of the rear housing shell 16. The upper region of the brace part 26a is formed with part-circular cutouts 50 that push the socket 32 holding the bight 21 and its two legs 42 and 43 firmly into the seat 44.

It should further be noted that the elongated holes L serve for angular adjustment of the support P.

The pivot axis of the bight and socket 31 and 32 is shown at B and the top of the support P at S.

The invention claimed is:

1. A motor-vehicle headrest comprising:
an upright mounting rod adapted to be anchored in a vehicle seat back;

an upright rear wall at an upper end of the rod and forming part of a rear forwardly open housing shell;

an upright front wall forming part of a front rearwardly open housing shell and spaced forward of and directly forming with the rear wall a cavity containing the upper end of the rod, the front wall being formed by a pair of side portions unitary with each other and each forming a wing;

membrane hinges between and formed unitarily with the side portions for pivoting the side portions about at least one upright axis; and upholstery surrounding the portions of the front wall.

2. The motor-vehicle headrest defined in claim 1 wherein the side-portion wings are pivotal between rear positions bearing rearwardly on the rear housing shell and front position pivoted forward therefrom.

3. The motor-vehicle headrest defined in claim 2 wherein the side-portion wings are formed with rearwardly extending rims that rearwardly overlap the rear shell even in the front position and thus always laterally close the cavity.

4. The motor-vehicle headrest defined in claim 1 wherein the front wall is further formed between the side portions with a central portion.

5. The motor-vehicle headrest defined in claim 4, further comprising a brace block fixed to at least one of the walls engaged axially forward with the front-wall central portion and rearward with the rear wall.

6. The motor-vehicle headrest defined in claim 4 wherein the brace block is unitary with the one wall.

7. The motor-vehicle headrest defined in claim 6 wherein the brace block has a rear part unitary with and extending forward from the rear wall and a front part unitary with and extending rearward from the front wall, the front and rear parts bearing on each other.

8. The motor-vehicle headrest defined in claim 5, further comprising means in the brace block connected to the mounting rod for limited pivoting of the block and walls about a generally horizontal axis on the rod.

9. The motor-vehicle headrest defined in claim 8 wherein the rod is U-shaped and has a horizontal bight interconnecting upper ends of two upright legs, the means for limited pivoting including a socket set in the brace block and gripping the bight.

10. The motor-vehicle headrest defined in claim 9 wherein the socket is a spring-steel sleeve fitted around the bight and set nonrotatably in the brace block.

11. The motor-vehicle headrest defined in claim 1, further comprising brake means between the side-portion wings and the rear shell inhibiting but not preventing pivoting of the side-portion wings.

12. The motor-vehicle headrest defined in claim 11 wherein the rear shell is formed with a pair of arcuate brake surfaces each centered on the pivot axis of a respective one of the side-portion wings, the brake means including respective friction bodies carried on the side-portion wings and bearing on the respective brake surfaces.

13. The motor-vehicle headrest defined in claim 12 wherein the rear shell is formed with a pair of arcuate inwardly projecting ribs each forming a respective one of the brake surfaces.

14. The motor-vehicle headrest defined in claim 13 wherein the friction bodies are each formed with a groove fitting over the respective rib.

15. The motor-vehicle headrest defined in claim 14 wherein each side-portion wing has a rearwardly projecting arm carrying the respective friction body.

16. The motor-vehicle headrest defined in claim 13 wherein the friction bodies are entropy elastic.

17. The motor-vehicle headrest defined in claim 1, further comprising interengaging latch formations on the shells securing same together.

* * * * *